3,009,833
RENDERING FIBROUS MATERIALS WATER-REPELLENT
James Cargill Somerville, Troon, Scotland, assignor to Imperial Chemical Industries Limited, London, England, a corporation of Great Britain
No Drawing. Filed Feb. 12, 1959, Ser. No. 792,707
Claims priority, application Great Britain Mar. 7, 1958
15 Claims. (Cl. 117—161)

This invention relates to improvements in or relating to the rendering of fibrous materials water-repellent and more particularly to the rendering of fibrous materials such as paper and textile fibres and fabrics water-repellent by treatment with suitable liquid organopolysiloxanes.

For many purposes it is desirable for materials such as textile fibres and fabrics and paper to have water-repellent and, in some cases, anti-stick properties. Various methods have been used and proposed for use to achieve these aims. Some of the methods available and which have been used commercially depend on the use of organopolysiloxanes as treating media. These methods do not, however, always give entirely satisfactory results. This may be due to one or more of a variety of reasons. Thus in some cases too high a temperature is required with a resultant tendency towards tendering of the treated materials. In other cases good results are achieved but these lack permanency while in other cases difficulty is experienced in applying the treating media, e.g. because of the difficulty of forming a stable homogeneous treating medium.

According to the present invention these disadvantages are overcome by a process comprising treating fibrous materials with a methylpolysiloxane fluid in the presence of an organo tin oxide and a metal octoate and thereafter exposing the treated material to such a temperature and for such a time that the methylpolysiloxane is cured.

The treating media used in my process may be in the form of an aqueous emulsion or may be in the form of a solution in an organic solvent. Suitable solvents which may be used include toluene, acetone, white spirits, isopropenol and the like.

Methylpolysiloxane fluids suitable for use in the process of my invention include those in which the ratio of methyl groups to silicon atoms is from about 1.02:1 to about 1.2:1. It is, however, preferred to use those having a ratio of methyl groups to silicon atoms of about 1.1:1. The proportions of polysiloxane fluid used may vary from about 0.5 percent to about 10 percent by weight of the treating medium. It is, however, preferred to use amounts of the order of about 1 percent to about 5 percent as these give good results coupled with reasonable economy in operation.

If desired, there may also be included in the treating media other organopolysiloxanes such as, for example, dimethylpolysiloxane fluids. These other organopolysiloxanes may be used in amount from about 50 percent to about 200 percent by weight of the methylpolysiloxane but are preferably used in amount from about 90 percent to about 110 percent.

Organo-tin oxides suitable for use in the process of my invention include alkyl and aryl tin oxides such as, for example, dibutyl-tin oxide, di-n-octyl-tin oxide, dicetyl-tin oxide, tri-n-octyl-tin oxide, tributyl-tin oxide, diphenyl-tin oxide, triphenyl-tin oxide and the like. It is preferred, however, to use dibutyl-tin oxide or di-n-octyl-tin oxide. The organo tin oxide may be used in amount from about 0.5 percent to about 10 percent by weight of the methylpolysiloxane. Amounts greater than this may, however, be used if desired although the additional effect is not commensurate with the increase in cost. It is preferred, however, to use amounts of the order of about 2 percent to about 6 percent.

In the treatment of paper, and especially paper for use with foodstuffs it is preferred to use di-n-octyl-tin oxide. This has been shown to be non-toxic on ingestion while certain other oxides which are otherwise suitable, for example, dibutyl tin oxide, are toxic on ingestion.

Metal octoates suitable for use in my process include the octoates of zinc, tin (stannous), lead and the like. The octoate is preferably a 2-ethyl hexoate and it is further preferred to use zinc 2-ethyl hexoate. The octoate may be used, in amount from about 2 percent to about 40 percent by weight of the methylpolysiloxane. It is, however, preferably used in amounts of the order of about 8 percent to about 25 percent.

It is preferred that the temperature to which the treated materials are exposed should not be greater than 150° C. and rather lower temperatures can be used equally satisfactorily. Higher temperatures may, however, be used if desired but no advantage is obtained thereby other than a reduced time of exposure. The time of exposure required is normally not more than about 4 minutes at 150° C. increasing with decrease in temperature, e.g. to 6 minutes at 125° C. or 8 minutes at 115° C. and until at ambient temperatures a period of days may be required.

In one method of carrying out the process of my invention, the metal octoate may be dissolved in a suitable solvent and the organo-tin oxide dissolved in this solution. Indeed, one of the very considerable advantages of my invention is the ease with which treating solutions may be prepared due to the organo-tin oxides being soluble in organic solvent solutions of the metal octoates. These solutions also have the advantage that stable aqueous emulsions may be prepared therefrom. Such an emulsion may be added to an aqueous emulsion of the methylpolysiloxane to form the treating media.

Fibrous materials which may be treated by the process of my invention include paper and natural and synthetic or regenerated fibres such as cotton, wool, viscose and acetate rayon, polyacrylonitrile fibres, synthetic linear polyamides such as nylons, protein fibres and the like. The materials treated may be in the form of filaments or yarns or of woven, knitted or felted fabrics and may be of one or more different fibres.

The finishes obtained on textile materials by the process of the present invention have good durability to laundering, solvent rinsing and the like. Paper treated by my process also has the advantage of having excellent anti-stick properties.

My invention is further illustrated by the following examples in which all parts and percentages are by weight.

*Example 1*

A solution of an organo-tin oxide and a metal octoate was prepared by dissolving 48 parts of zinc 2-ethyl hexoate containing 18 percent of zinc in 30 parts of toluene and adding 12 parts of dibutyl-tin oxide and agitating until a clear solution was obtained. 6 parts of this solution were added to a solution of 15 parts of a methylpolysiloxane fluid having 1.1 methyl groups per silicon atom and 15 parts of a dimethylpolysiloxane fluid having 2.02 methyl groups per silicon atom in 964 parts of white spirits.

A number of pieces of cotton and wool gaberdine were padded with this solution, dried in a current of air for 5 minutes at 100 to 110° C. and baked at 150° C. for 5 minutes. The water repellency of the treated fabrics was determined by the spray rating test (spray rating—B.S. Handbook No. 11 1949, pp. 278–9) and found to be 100. The treated and untreated fabrics were also subjected to the Bundesmann test (Tentative Test No. 8—J. Textile Institute, June 1955, vol. 46, pp. S51–6) and gave the results shown in the table following Example 13.

*Example 2*

90 parts of the organo-tin oxide and metal octotate solution used in Example 1 were emulsified with a solution of 20 parts of a 15 percent aqueous solution of the sodium salt of a modified polyvinyl acetate/maleate polymer in 77.5 parts of water.

30 parts of each of the polysiloxane fluids used in Example 1 were mixed with 1.5 parts of oleic acid and the mixture thereafter emulsified with a dispersion of 1.5 parts of sulphonated methyl oleate in 37 parts of water.

112 parts of the polysiloxane emulsion so obtained were dispersed in 500 parts of water and 28 parts of the organo-tin oxide/metal octoate emulsion added thereto. A further 1360 parts of water were then added and the mixture thoroughly stirred. Pieces of cotton gaberdine and wool gaberdine were padded with this mixture, dried in a current of air for 5 minutes at 100° C. and baked for 5 minutes at 150° C. The treated fabrics were tested by the spray rating test and by the Bundesmann test. The spray rating of both fabrics was 100. The results obtained in the Bundesmann test are given in the table following Example 13.

*Example 3*

A solution of an organo-tin oxide and a metal octoate was prepared by dissolving 48 parts of zinc 2-ethyl hexoate containing 18 percent of zinc, in 30 parts of toluene and adding 12 parts of di-n-octyl-tin oxide and agitating until a clear solution was obtained.

A padding solution was made as in Example 1 using the above solution in place of the dibutyl-tin oxide solution.

Pieces of cotton gaberdine and wool gaberdine were padded with this solution and treated as in Example 1. Both treated fabrics had a spray rating of 100 and the results of the Bundesmann test were as shown in the table following Example 13.

*Example 4*

An emulsion of an organo tin oxide and metal octoate was prepared by the method used in Example 2 using the organo tin oxide/metal octoate solution of Example 3 in place of that of Example 1.

112 parts of the polysiloxane fluid emulsion used in Example 3 were mixed with 500 parts of water and 28 parts of the above emulsion added thereto. 1360 parts of water were then added and the mixture thoroughly stirred.

Pieces of cotton gaberdine and wool gaberdine were padded with this liquor and thereafter treated as in Example 1. The spray rating of the treated fabrics was 100. The results obtained when the treated fabrics were tested by the Bundesmann test are given in the table following Example 13.

*Example 5*

12 parts of zinc 2-ethylhexoate were dissolved in 7.5 parts of toluene and 3 parts of diphenyl-tin oxide dissolved therein.

15 parts of each of the polysiloxane fluids used in Example 1 were dissolved in 964 parts of white spirits and 6 parts of the above solution added thereto.

Pieces of cotton gaberdine and wool gaberdine were padded with this solution and thereafter treated as in Example 1. The treated fabrics had a spray rating of 100 and when tested by the Bundesmann test gave the results shown in the table following Example 13.

*Examples 6–10*

A number of solutions were made up containing 30 parts of polysiloxane fluids consisting of various proportions of the methylpolysiloxane fluid and the dimethylpolysiloxane fluid used in Example 1, 6 parts of the organo-tin oxide/metal octoate solution used in Example 1 and 964 parts of white spirits. The proportions of the two polysiloxane fluids used were as follows:

| Example | Polysiloxane fluid | |
|---|---|---|
| | Methyl | Dimethyl |
| 6 | 3 | 7 |
| 7 | 4 | 6 |
| 8 | 5 | 5 |
| 9 | 6 | 4 |
| 10 | 10 | |

A number of pieces of cotton gaberdine and wool gaberdine were padded with the above solutions and thereafter treated as in Example 1. The treated materials had a spray rating of 100 and when tested by the Bundesmann test gave the results shown in the following Example 13.

*Example 11*

A solution of an organo-tin oxide and a metal octoate was prepared by dissolving 32 parts of stannous octoate containing 24 percent stannous tin in 60 parts of toluene and adding 8 parts of dibutyl-tin oxide followed by agitation until a solution was obtained. 10 parts of this solution were added to a solution of 15 parts of a methylpolysiloxane fluid having 1.1 methyl groups per silicon atom and 15 parts of a dimethylpolysiloxane fluid having 2.02 methyl groups per silicon atom in 964 parts of white spirits.

A number of pieces of cotton and wool gaberdine were padded with this solution, dried in a current of air for 5 minutes at 100 to 110° C. and baked at 150° C. for 5 minutes. The water-repellency of the treated fabrics was determined by the spray rating test and both were found to be 100. The treated and untreated fabrics were also subjected to the Bundesmann test and gave the results shown in the table after Example 13.

*Example 12*

The procedure of Example 11 was repeated, the only difference being that the stannous octoate was replaced by 32 parts of lead octoate containing 40 percent of lead. The spray rating of the treated fabrics was found to be 100 and the results of the Bundesmann test are shown in the table following Example 13.

*Example 13*

5 parts of dibutyl-tin oxide were dissolved in 100 parts of ethyl acetate by boiling for 3 hours. The excess ethyl acetate was distilled off and a product containing a tin content of 32 percent was obtained. A solution was prepared by dissolving 48 parts of zinc 2-ethyl hexoate containing 18 percent of zinc in 30 parts of toluene and 12 parts of the tin oxide solution prepared as above added thereto, after which the mixture was agitated until a clear solution was obtained. 6 parts of this solution were added to 15 parts of each of the polysiloxane fluids used in Example 1 dissolved in 964 parts of white spirits. A number of pieces of cotton garberdine were padded with this solution, dried in a current of air for 5 minutes at 100 to 110° C. and baked at 150° C. for 5 minutes. The water-repellency of the treated material was determined and the spray rating found to be 100. The results of the Bundesmann test are given in the following table.

| Example | Fabric | Bundesmann test | |
|---|---|---|---|
| | | Penetration (ml.) | Absorption percent (continental) |
| 1 | Untreated wool gaberdine | 21 | 70 |
| | Treated wool gaberdine | 3 | 12 |
| | Untreated cotton gaberdine | 7 | 105 |
| | Treated cotton gaberdine | 0 | 13 |
| 2 | Wool gaberdine | 6 | 14.0 |
| | Cotton gaberdine | 0 | 9.0 |
| 3 | Wool gaberdine | 5 | 13 |
| | Cotton gaberdine | 0 | 15 |
| 4 | Wool gaberdine | 5 | 13 |
| | Cotton gaberdine | 0 | 15 |
| 5 | Wool gaberdine | 0 | 18 |
| | Cotton gaberdine | 0 | 10 |
| 6 | Wool gaberdine | 5 | 12 |
| | Cotton gaberdine | 0 | 14 |
| 7 | Wool gaberdine | 7 | 12 |
| | Cotton gaberdine | 0 | 12 |
| 8 | Wool gaberdine | 7 | 13 |
| | Cotton gaberdine | 0 | 13 |
| 9 | Wool gaberdine | 8 | 11 |
| | Cotton gaberdine | 0 | 13 |
| 10 | Wool gaberdine | 0 | 25 |
| | Cotton gaberdine | 0 | 25 |
| 11 | Wool gaberdine (untreated) | 21 | 70 |
| | Wool gaberdine (treated) | 0 | 9 |
| | Cotton gaberdine (untreated) | 7 | 105 |
| | Cotton gaberdine (treated) | 0 | 13 |
| 12 | Wool gaberdine | 0 | 16 |
| | Cotton gaberdine | 0 | 11 |
| 13 | Cotton gaberdine | 0 | 10 |

*Example 14*

36 parts of the polysiloxane emulsion described in Example 2 and 9 parts of the organo-tin oxide/metal octoate emulsion described in Example 2 were mixed together and added to 955 parts of water and thoroughly mixed.

Pieces of kraft paper and vegetable parchment were passed through the above emulsion and the excess liquor drained off. The treated materials were then heated for 2 minutes in a current of air at 120° C. and stored at 20° C. for 72 hours. Both materials had excellent water-repellent properties.

A portion of the kraft paper was formed into a tray and molten asphalt at a temperature of 180° C. poured into it. After allowing the asphalt to cool, it was possible to strip the paper off cleanly without tearing or sticking of the surface fibres. A similar procedure was followed with a portion of untreated kraft paper and it was found that this adhered strongly to the asphalt and could not be removed without tearing.

A portion of the vegetable parchment was heated in contact with jam for 45 minutes at 150° C. by which time the jam had become caramelised. After cooling the jam was readily removable and showed no tendency to stick to or tear the parchment. Untreated parchment tested in the same way adhered very strongly to the jam and tore easily when an attempt was made to separate them.

*Example 15*

Pieces of kraft paper and vegetable parchment were treated in a manner similar to that of Example 11 using the composition used in Example 4. The treated materials were of excellent water-repellency and when tested by the methods described in Example 14 gave similar results.

*Example 16*

20 parts of the methylpolysiloxane fluid used in Example 1 were added to 976 parts of isopropanol and 4 parts of the organo tin oxide/metal octoate solution used in Example 1 added thereto.

Pieces of kraft paper and vegetable parchment were immersed in this solution, drained, heated at 120° C. for 2 minutes and stored at 20° C. for 120 hours. The treated materials had excellent water-repellency and when tested by the methods described in Example 14 gave similar results.

*Example 17*

20 parts of the methylpolysiloxane fluid used in Example 1 were added to 976 parts of isopropanol and 4 parts of the organo-tin oxide/metal octoate solution of Example 3.

Pieces of kraft paper and vegetable parchment were immersed in this solution, heated at 120° C. for 2 minutes and stored at 20° C. for 120 hours. The treated materials had excellent water-repellency and when tested by the methods described in Example 14 gave similar results.

What I claim is:

1. A process for improving the water repellency of fibrous materials comprising treating the said fibrous materials with a methylpolysiloxane fluid in the presence of an organo-tin oxide in amount up to about 10 percent by weight of the methylpolysiloxane fluid and a metal octoate in amount up to about 40 percent by weight of the methylpolysiloxane fluid, and thereafter exposing the treated material to a temperature not greater than 150° C. whereby the methylpolysiloxane is cured.

2. A process according to claim 1 wherein the ratio of methyl groups to silicon atoms in the methylpolysiloxane fluid is from about 1.02:1 to about 1.2:1.

3. A process according to claim 2 wherein the ratio is about 1.1:1.

4. A process according to claim 1 wherein the methylpolysiloxane fluid is present in amount from about 0.5 percent to about 10 percent by weight of the treating medium.

5. A process according to claim 3 wherein the amount is from about 1 percent to about 5 percent.

6. A process according to claim 1 wherein the organo tin oxide is selected from the group consisting of an alkyl- and aryl-tin oxide.

7. A process according to claim 1 wherein the metal octoate is selected from the group consisting of an octoate of zinc, tin (stannous), and lead.

8. A process according to claim 7 wherein the octoate is 2-ethyl hexoate.

9. A process according to claim 1 wherein the fibrous material is selected from the group consisting of paper, natural and synthetic fibres in the form of filaments, yarns and woven, knitted and felted fabrics.

10. A process according to claim 1 wherein the treating medium is in the form of an aqueous emulsion.

11. A process according to claim 1 wherein the treating medium is in the form of an organic solvent solution and the organic solvent is selected from the group consisting of toluene, acetone, petroleum spirits and isopropanol.

12. A process according to claim 1 wherein the amount of organo-tin oxide is from about 2 percent to about 6 percent.

13. A process according to claim 1 wherein the amount of metal octoate is from about 8 percent to about 25 percent.

14. A process according to claim 1 wherein the treating medium also includes a dimethylpolysiloxane fluid in amount of from about 50 to 200% by weight of said methylpolysiloxane fluid.

15. A process according to claim 14 wherein the amount of dimethylpolysiloxane fluid is from about 90 percent to about 110 percent.

References Cited in the file of this patent

UNITED STATES PATENTS

| | | |
|---|---|---|
| 2,588,365 | Dennett | Mar. 11, 1952 |
| 2,757,152 | Solomon | July 31, 1956 |
| 2,770,611 | Nitzsche et al. | Nov. 13, 1956 |
| 2,818,906 | Braley | Jan. 7, 1958 |